US011983472B2

(12) United States Patent
Chen et al.

(10) Patent No.: US 11,983,472 B2
(45) Date of Patent: May 14, 2024

(54) METHOD FOR IDENTIFYING FRAGILE LINES IN POWER GRIDS BASED ON ELECTRICAL BETWEENNESS

(71) Applicant: Hunan University of Science and Technology, Xiangtan (CN)

(72) Inventors: Chaoyang Chen, Xiangtan (CN); Yong Zhou, Xiangtan (CN); Zuguo Chen, Xiangtan (CN); Li He, Xiangtan (CN); Zhuangxi Tan, Xiangtan (CN); Pei Li, Xiangtan (CN); Ying Zou, Xiangtan (CN); Xiaowen Wu, Xiangtan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 0 days.

(21) Appl. No.: 18/191,149

(22) Filed: Mar. 28, 2023

(65) Prior Publication Data
US 2024/0054259 A1 Feb. 15, 2024

(30) Foreign Application Priority Data

Aug. 10, 2022 (CN) .......................... 202210961314.2

(51) Int. Cl.
*G06F 30/20* (2020.01)
*G06F 113/04* (2020.01)
(Continued)

(52) U.S. Cl.
CPC .......... *G06F 30/20* (2020.01); *H02J 3/00125* (2020.01); *G06F 2113/04* (2020.01); *G06F 2119/02* (2020.01); *H02J 2203/20* (2020.01)

(58) Field of Classification Search
None
See application file for complete search history.

(56) References Cited

U.S. PATENT DOCUMENTS 10,691,154 B1 * 6/2020 Hoffmann ............... G05F 1/66
2012/0072039 A1 * 3/2012 Anderson ............. G06Q 10/04
700/297

(Continued)

FOREIGN PATENT DOCUMENTS

AU 2020103195 A4 1/2021
CN 1976160 A 6/2007
(Continued)

OTHER PUBLICATIONS

Cao Yi-jia et al., "Identification of vulnerable lines in power grid based on complex network theory", "Electric Power Automation Equipment", English Abstract, Dec. 1, 2006, 6 pp., vol. 26 No. 12.
(Continued)

*Primary Examiner* — Jared Fureman
*Assistant Examiner* — Joel Barnett

(57) ABSTRACT

Disclosed is a method for identifying fragile lines in power grid based on electrical betweenness, which comprises the following steps: constructing the power grid into a network diagram, sequentially removing lines in the network diagram, and sorting the electrical betweenness of each line from large to small; constructing a nonlinear model of complex network cascade failure considering overload and weighted edges, and respectively performing two ways of removing lines for sorted electrical betweenness, namely sequentially removing preset proportion lines and sequentially removing all lines until no new lines are removed in the network diagram; obtaining a change of generator-load power before and after each line removal, and evaluating a severity of power grid failure based on the change of generator-load power, thus completing an identification of power grid fragile lines.

9 Claims, 22 Drawing Sheets

(51) Int. Cl.
*G06F 119/02* (2020.01)
*H02J 3/00* (2006.01)

(56) References Cited

U.S. PATENT DOCUMENTS

2020/0256910 A1* 8/2020 Golnari ............... G01R 31/088
2020/0348353 A1* 11/2020 Liu .......................... H02H 7/28

FOREIGN PATENT DOCUMENTS

| CN | 105389629 A | 3/2016 |
| CN | 105528645 A | 4/2016 |
| CN | 107895947 A | 4/2018 |
| CN | 110034581 A | 7/2019 |
| CN | 111092453 A | 5/2020 |
| CN | 114665498 A | 6/2022 |
| WO | 2022/134596 A1 | 6/2022 |

OTHER PUBLICATIONS

Chao Yang Chen et al., "Nonlinear model of cascade failure in weighted complex networks considering overloaded edges", Scientific Reports natureresearch, dated 2020, 12 pp., 10:13428, https://doi.org/10.1038/s41598-020-69775-5.

Chen Chao-yang, "Review of large power grid vulnerability based on complex network theory", "Control and Decision", Apr. 1, 2022, English Abstract, 17 pp., vol. 37 No. 4.

Mao Nai-hu et al., "Research on differential current dynamic reminiscing principle", "Electric Power Automation Equipment", Dec. 1, 2006, English Abstract, 6 pp., vol. 26 No. 12.

Zhenfan Yu et al., "Identification of Critical Lines in Power Grid Based on Electric Betweenness Entropy", 2015 IEEE PES Asia-Pacific Power and Energy Engineering Conference (APPEEC), dated 2015, 5 pp.

* cited by examiner

METHOD FOR IDENTIFYING FRAGILE LINES IN POWER GRIDS BASED ON ELECTRICAL BETWEENNESS

CROSS-REFERENCE TO RELATED APPLICATIONS

This application claims priority to Chinese Patent Application No. 202210961314.2, filed on Aug. 10, 2022, the contents of which are hereby incorporated by reference.

TECHNICAL FIELD

The application belongs to the field of complex networks, and in particular relates to a method for identifying fragile lines in power grids based on electrical betweenness.

BACKGROUND

With the increasing interconnection of large power grids, blackouts are increasing. In August 2003, there was a large-scale power outage in the United States and Canada. In September of the same year, a power/communication dependent network chain blackout occurred in Italy. According to the analysis of accident causes, blackout accidents are generally caused by individual transmission line jumpers, and most of the lines with high transmission power and few of them are in special positions in the power grid topology, which have a significant impact on the system, which is an important incentive for cascade failure of the power grid. In this process, fragile lines in the power grid often play a key role in the stability of the power grid. Therefore, it is of great theoretical and practical significance to identify the fragile lines of power grid for studying the generation and propagation of cascade failures.

In order to overcome the shortcomings of previous methods that assume that the electric power flow only flows along the shortest path, the conventional electrical betweenness algorithm uses all path algorithms to search the "power generation-load" node pairs in the power grid. Although it can improve the accuracy of identifying fragile lines to a certain extent, it is quite time-consuming, so it is not suitable for systems with a large number of nodes. The existing model introduces the index of "connectivity level" or "percentage of load loss" to reflect the damage degree of the system after the failure. The connectivity level does not take into account the self-balance ability of the internal power of each subsystem after the disconnection, and the percentage of load loss ignores the damage degree of the damaged generator to the power grid, so it needs to be supplemented. It is an urgent problem to establish a fragile line identification method with both accuracy and efficiency and an evaluation index in line with the physical background on the basis of the existing model.

SUMMARY

In order to solve the above technical problems, the application provides a method for identifying fragile lines in power grids based on electrical betweenness, which significantly reduces the calculation cost and may consider accuracy and efficiency at the same time.

In order to achieve the above objective, the present application provides a method for identifying fragile lines in power grids based on electrical betweenness, including following steps.

constructing the power grids into a network diagram, sequentially removing lines in the network diagram, and sorting the electrical betweenness of each line from large to small;

constructing a nonlinear model of complex network cascade failure considering overload and weighted edges, and respectively performing two ways of removing the lines for sorted electrical betweenness according to the nonlinear model of the complex network cascade failure, namely sequentially removing preset proportion lines and sequentially removing all lines until no new lines are removed in the network diagram; where removing the preset proportion lines is to test the influence of different parameters on the identification of electrical betweenness lines under the nonlinear model of complex network cascade failure, and removing all lines is to test the identification effect of electrical betweenness lines with fixed parameters; and obtaining a change of generator-load power before and after each line is removed, and evaluating a severity of power grid failure based on the change of the generator-load power, and then completing an identification of the power grid fragile lines.

Optionally, sorting the electrical betweenness of each line includes:

obtaining the electrical betweenness of all lines in the network diagram, and storing the electrical betweenness with a maximum value; and removing the lines with the maximum electrical betweenness, re-obtaining the electrical betweenness of remaining lines, saving a re-obtained maximum value of the electrical betweenness, repeating the operation until all lines are removed, and finally sorting saved electrical betweenness of each line from large to small.

Optionally, sequentially removing preset proportion lines according to the sorted electrical betweenness includes:

changing only one parameter in the nonlinear model of the complex network cascade failure is changed at a time, keeping rest parameters unchanged, sorting the sorted electrical betweenness, and sequentially removing the preset proportion lines are, wherein a preset processing is repeated after one line is removed at a time until all the preset proportion lines are removed from the network diagram.

Optionally, sequentially removing all lines according to the sorted electrical betweenness includes:

keeping the parameters in the nonlinear model of complex network cascade failure unchanged, sorting according to the sorted electrical betweenness, sequentially removing the lines in the network diagram from large to small, and repeating the preset processing every time until the network diagram is without lines.

Optionally, the preset processing includes:

sequentially removing the sorted lines with a largest electrical betweenness from the network diagram, and simulating the cascade failure caused by the line removal until the cascade failure is terminated.

Optionally, sequentially removing the lines with the largest electrical betweenness from the network diagram includes:

on the nonlinear model of complex network cascade failure, removing the lines with the largest electrical betweenness from the network diagram, and whether an adjacent edge or a sub-adjacent edge of the line is overloaded or failed is judged according to a preset adjacent edge overload probability.

Optionally, until the cascade failure is terminated, including:

removing the lines with the largest electrical betweenness in a list in turn, performing line failure or overload according to a preset formula after every time the lines are removed until no lines in the network diagram fail, and then the cascade failure caused by the lines with the largest electrical betweenness in the corresponding list being terminated.

Optionally, the preset formula is:

$$\begin{cases} C_{im} < \Delta L_{im} + L_{im} < \delta C_{im} & p_{im} < P_o \\ C_{mk} < \Delta L_{mk} + L_{mk} < \delta C_{mk} & p_{mk} < P'_o \end{cases}$$

where $P_o$ is an adjacent edge overload probability, $P_o'$ is a sub-adjacent edge overload probability, $p_{im}$ is a distribution of a failure edge $e_{im}$, $p_{mk}$ is a distribution of failure edge $e_{mk}$, $L_{im}$ is a load of $e_{im}$, $C_{im}$ is a capacity of $e_{im}$, $e_{im}$ is an adjacent side of edge $e_{ij}$, $L_{mk}$ is a load of $e_{mk}$, $C_{mk}$ is a capacity of $e_{mk}$, $e_{mk}$ is an adjacent side of edge $e_{im}$, and $\delta$ is an overload coefficient.

Optionally, the acquisition method of generator-load power change before and after line removal is as follows:

$$P_{GL} = (\Sigma P'/P) \times 100\%,$$

where P' is a total active power sum of all connected sub-diagram after the failure, P is a total active power sum of connected networks before the failure, and $P_{GL}$ is the percentage of generator-load power.

Compared with the prior art, the application has the following advantages and technical effects.

According to the method for identifying fragile lines in power grid based on electrical betweenness provided by the application, the calculation cost is substantially reduced, and accuracy and efficiency are improved. Secondly, in view of the deficiency of the original index, the proposed generator-load power percentage index is used in the specific process of analyzing the cascade failure propagation mechanism of power grid, and the dynamic influence of line failures on the system is considered.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application. In the attached drawings:

FIG. 5A is a $P_{GL}$ change diagram after removing 10% lines when $\theta=0.6$, $\omega=1$, $\delta=1.18$; FIG. 5B is a $P_{GL}$ change diagram after removing 10% lines when $\theta=0.6$, $\omega=1$, $\delta=1.18$; FIG. 5C is a $P_{GL}$ change diagram after removing 10% lines when $\alpha=0.45$, $\omega=1$, $\delta=1.18$; FIG. 5D is a $P_{GL}$ change diagram after removing 10% lines when $\alpha=0.45$, $\theta=0.6$, $\delta=1.18$; FIG. 5E is a $P_{GL}$ change diagram after removing 10% lines when $\alpha=0.45$, $\omega=1$, $\theta=0.6$.

FIG. 6A is a $P_{GL}$ change diagram after removing 10% lines when $\theta=0.6$, $\omega=1$, $\delta=1.18$; FIG. 6B is a $P_{GL}$ change diagram after removing 10% lines when $\theta=0.6$, $\omega=1$, $\delta=1.18$; FIG. 6C is a $P_{GL}$ change diagram after removing 10% lines when $\alpha=0.45$, $\omega=1$, $\delta=1.18$; FIG. 6D is a $P_{GL}$ change diagram after removing 10% lines when $\alpha=0.45$, $\theta=0.6$, $\delta=1.18$; FIG. 6E is a $P_{GL}$ change diagram after removing 10% lines when $\alpha=0.45$, $\omega=1$, $\theta=0.6$.

FIG. 7A is a $P_{GL}$ change diagram after removing 10% lines when $\theta=0.6$, $\omega=1$, $\delta=1.15$; FIG. 7B is a $P_{GL}$ change diagram after removing 10% lines when $\theta=0.6$, $\omega=1$, $\delta=1.15$; FIG. 7C is a $P_{GL}$ change diagram after removing 10% lines when $\alpha=0.45$, $\omega=1$, $\delta=1.15$; FIG. 7D is a $P_{GL}$ change diagram after removing 10% lines when $\alpha=0.45$, $\theta=0.6$, $\delta=1.15$; FIG. 7E is a $P_{GL}$ change diagram after removing 10% lines when $\alpha=0.45$, $\omega=1$, $\theta=0.6$.

DETAILED DESCRIPTION OF THE EMBODIMENTS

Figure 1:
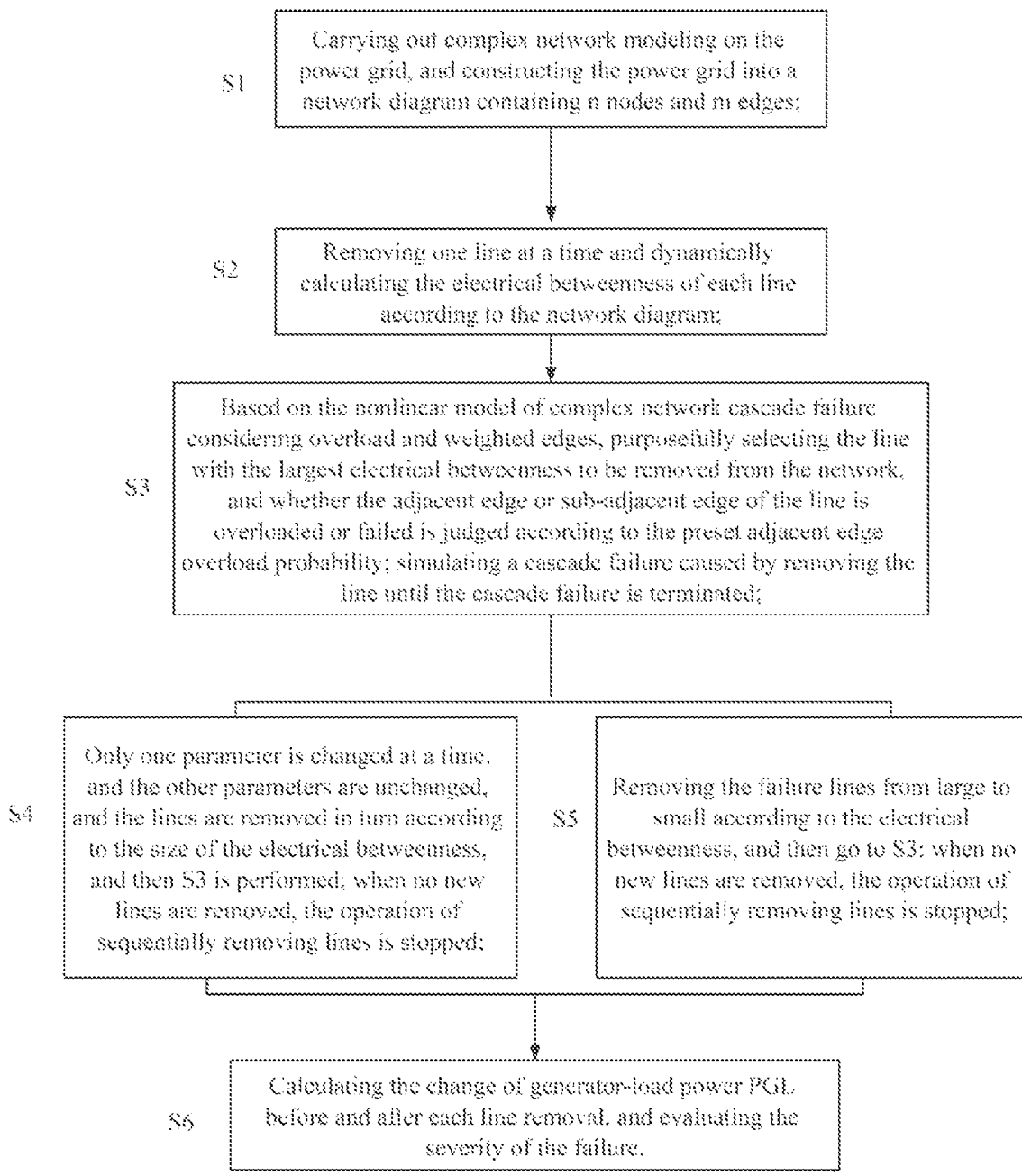
FIG. 1 is a schematic flow diagram of a method according to an embodiment of the present application.

It should be noted that the embodiments in this application and the features in the embodiments may be combined with each other without conflict. The present application will be described in detail with reference to the attached drawings and embodiments.

It should be noted that the steps shown in the flowchart of the accompanying drawings may be executed in a computer system such as a set of computer-executable instructions, and although the logical order is shown in the flowchart, in some cases, the steps shown or described may be executed in a different order from here.

Embodiment

This embodiment provides a method for identifying fragile lines in power grid based on electrical betweenness, including following steps:

constructing the power grid into a network diagram, sequentially removing lines in the network diagram, and sorting the electrical betweenness of each line from large to small;

constructing a nonlinear model of complex network cascade failure considering overload and weighted edges, and respectively performing two ways of removing lines for sorted electrical betweenness, namely sequentially removing preset proportion lines and sequentially removing all lines until no new lines are removed in the network diagram; where, removing the preset proportion lines is to test the influence of different parameters on the identification of electrical betweenness lines under the nonlinear model of complex network cascade failure, and removing all lines is to test the identification effect of electrical betweenness lines with fixed parameters; (the nonlinear model of complex network cascade failure considering overload and weighted edges is the prior art, in order to make the cascade failure model closer to the actual network. The overload coefficient is used to describe the redundancy of edges, the weight coefficient is used to describe the interaction intensity between nodes, the distribution coefficient is used to describe the uncertainty of failures, and the capacity parameter is used to describe the nonlinear relationship of different proportions).

obtaining a change of generator-load power before and after each line removal, and evaluating a severity of power grid failure based on the change of generator-load power, thus completing an identification of power grid fragile lines.

Further, sorting the electrical betweenness of each line includes:

obtaining the electrical betweenness of all lines in the network diagram, and storing the electrical betweenness with a maximum value;

removing the lines with the maximum electrical betweenness, re-obtaining the electrical betweenness of remaining lines, saving a re-obtained maximum value of the electrical betweenness, repeating the operation until all lines are removed, and finally sorting saved electrical betweenness of each line from large to small.

Further, sequentially removing preset proportion lines according to the sorted electrical betweenness includes:

The nonlinear model of complex network cascade failure considering overload and weighted edges includes five parameters, which are α, β, θ, ω and δ respectively, and only one parameter in the nonlinear model of complex network cascade failure is changed at a time, and the rest parameters are unchanged, and sorting the sorted electrical betweenness, the preset proportion lines are sequentially removed, where a preset processing is repeated after removing one line at a time until all the preset proportion lines are removed from the network diagram.

Further, sequentially removing all lines according to the sorted electrical betweenness includes:

keeping the parameters in the nonlinear model of complex network cascade failure unchanged, sorting according to the sorted electrical betweenness, sequentially removing the lines in the network diagram from large to small, and repeating the preset processing every time until the network diagram is wireless.

Further, the preset processing includes:

sequentially removing the sorted lines with the largest electrical betweenness from the network diagram, and simulating the cascade failure caused by the line removal until the cascade failure is terminated.

Further, sequentially removing the lines with the largest electrical betweenness from the network diagram includes:

on the nonlinear model of complex network cascade failure, removing the lines with the largest electrical betweenness from the network diagram, and whether an adjacent edge or a sub-adjacent edge of the line is overloaded or failed is judged according to a preset adjacent edge overload probability. The greater the overload probability of the adjacent edge, the easier the adjacent edge is to overload, and on the contrary, the easier the adjacent edge is to fail.

Further, until the cascade failure is terminated, including: removing the lines with the largest electrical betweenness in the list in turn, and every time the lines are removed, perform line failure or overload according to a preset formula until the wireless paths in the network diagram fail, and then the cascade failure caused by the lines with the largest electrical betweenness in the corresponding list stops.

Further, the preset formula is:

$$\begin{cases} C_{im} < \Delta L_{im} + L_{im} < \delta C_{im} & p_{im} < P_o \\ C_{mk} < \Delta L_{mk} + L_{mk} < \delta C_{mk} & p_{mk} < P'_o \end{cases}$$

where $P_o$ is an adjacent edge overload probability, $P_o'$ is a sub-adjacent edge overload probability, $p_{im}$ is a distribution of a failure edge $e_{im}$, $p_{mk}$ is a distribution of failure edge $e_{ij}$, $L_{im}$ is a load of $e_{im}$, $C_{im}$ is a capacity of $e_{im}$, $e_{im}$ is an adjacent side of edge $e_{ij}$, $L_{mk}$ is a load of $e_{mk}$, $C_{mk}$ is a capacity of $e_{mk}$, $e_{mk}$ is an adjacent side of edge $e_{im}$, and $\delta$ is an overload coefficient.

Further, the acquisition method of generator-load power change before and after line removal is as follows:

$$P_{GL} = (\Sigma P'/P) \times 100\%,$$

where P' is a total active power sum of all connected subgraphs after the failure, P is a total active power sum of connected grids before the failure, and $P_{GL}$ is a percentage of generator-load power.

Figure 3:
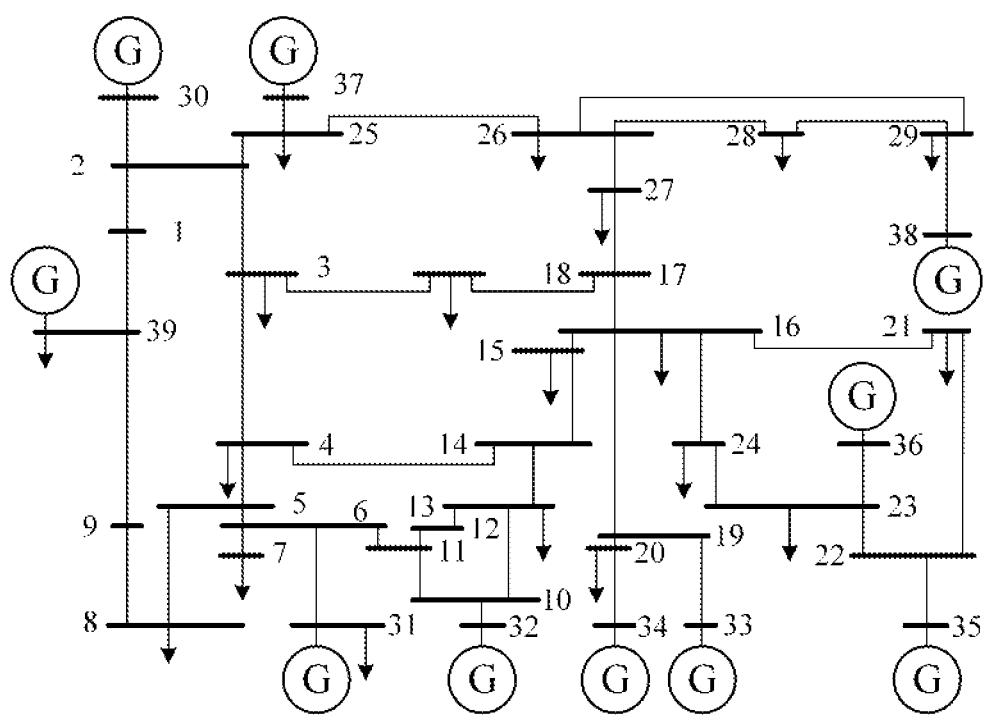
FIG. 3 is a wiring diagram of an IEEE39 system according to an embodiment of the present application.
Figure 4:
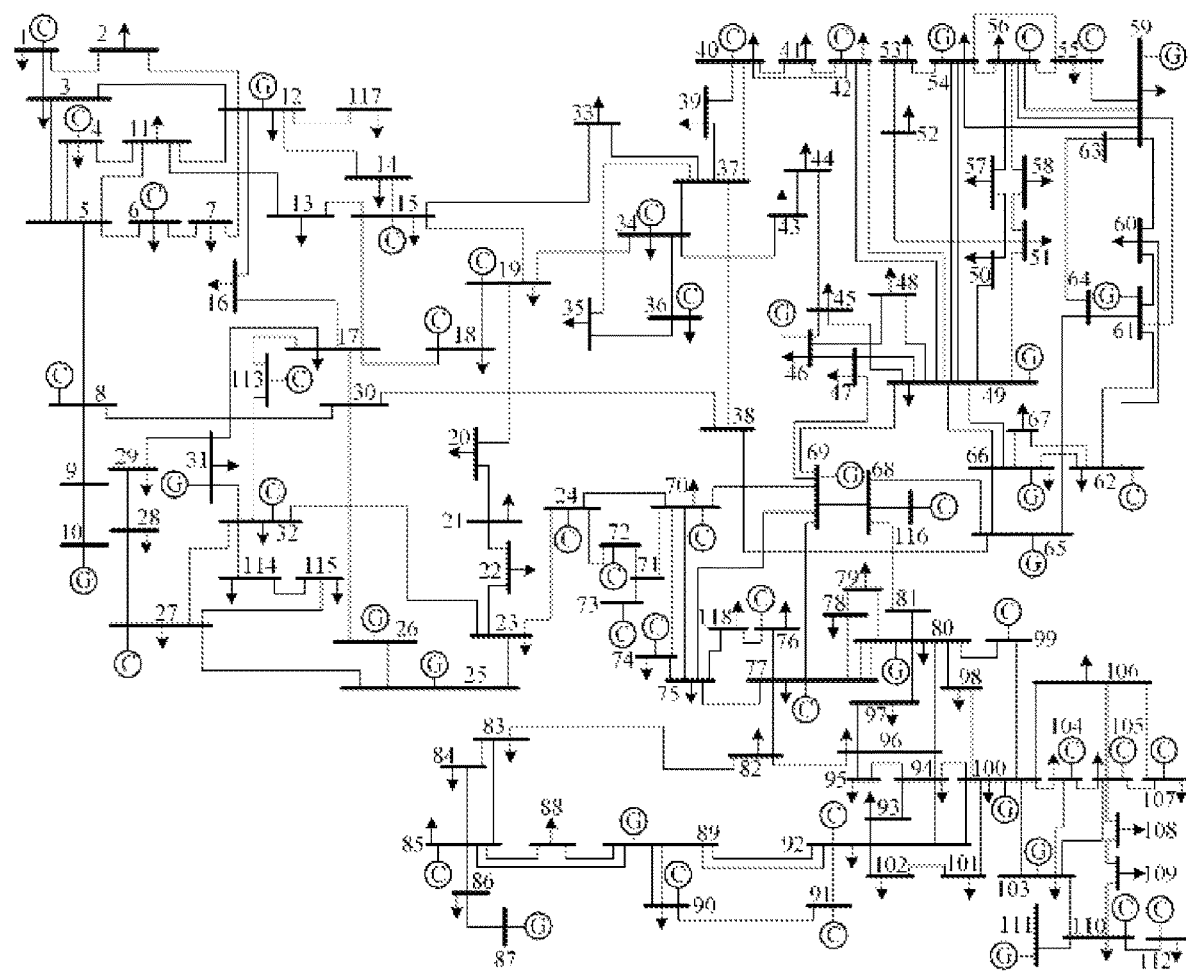
FIG. 4 is a wiring diagram of an IEEE118 system according to an embodiment of the present application.
Figure 5A:
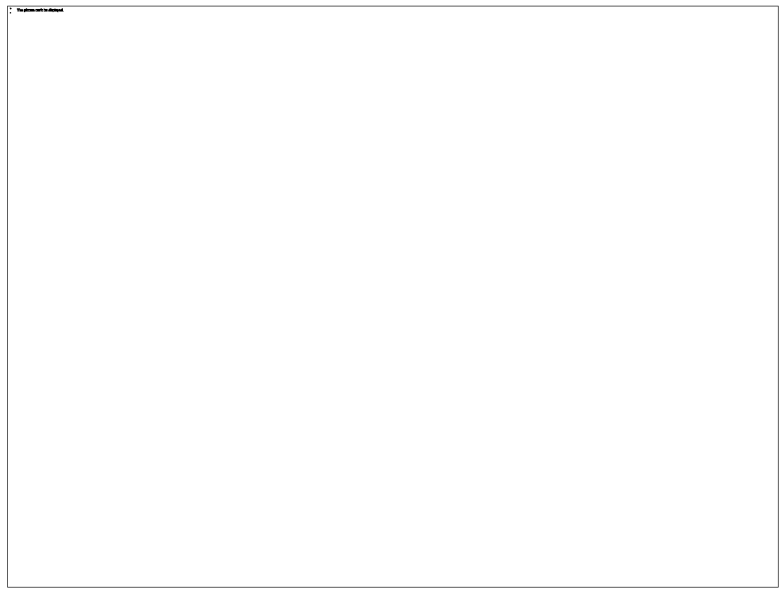
FIG. 5A, FIG. 5B, FIG. 5C, FIG. 5D and FIG. 5E are $P_{GL}$ change diagrams (all path algorithm search) of an IEEE39-node system after removing 10% lines according to an embodiment of the present application, where
Figure 5B:
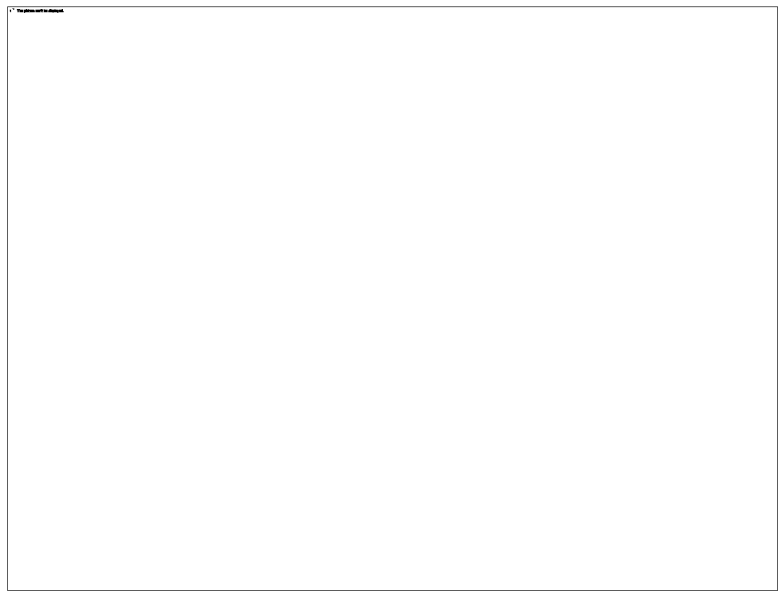
Figure 5C:
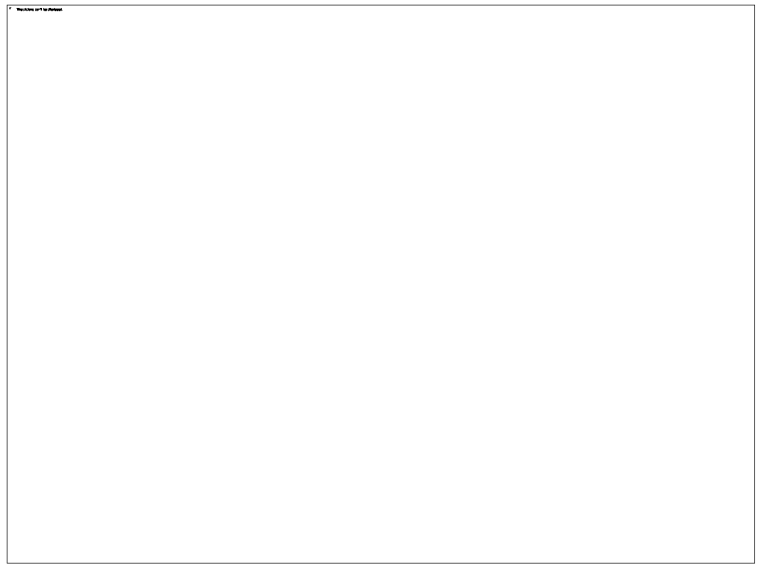
Figure 5D:
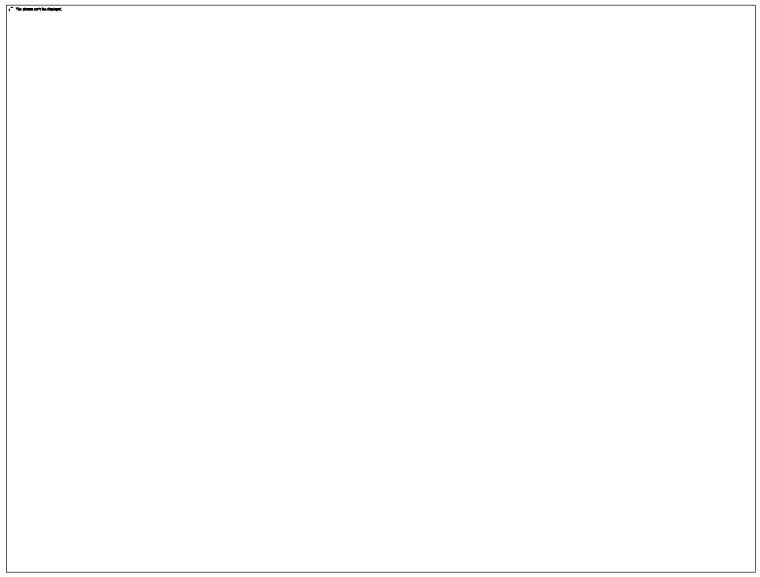
Figure 5E:
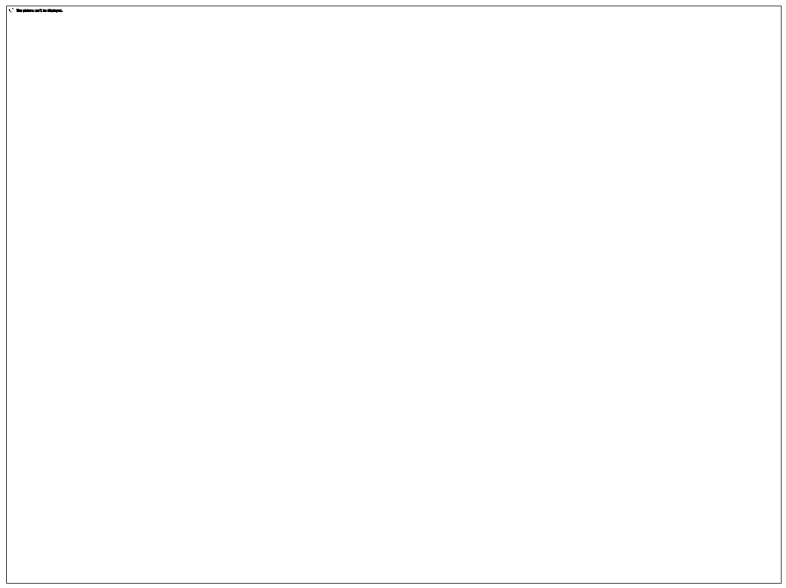
Figure 6A:
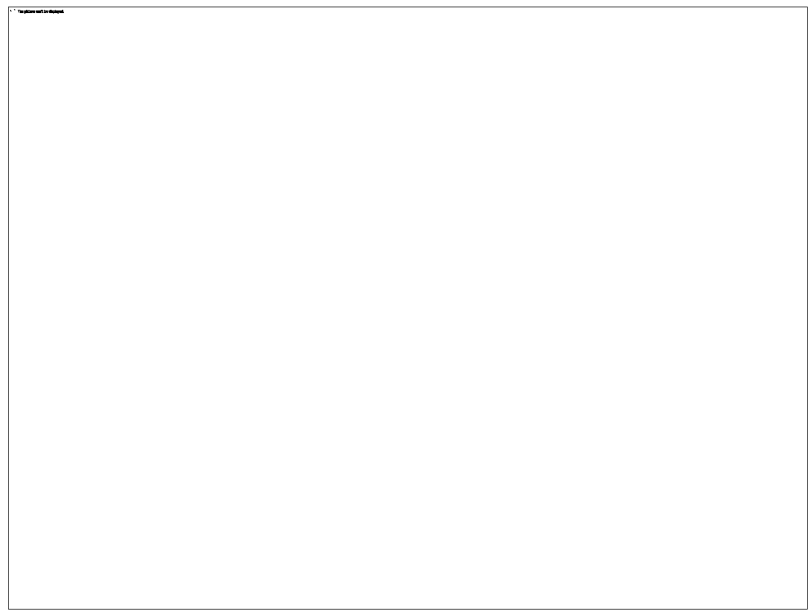
FIG. 6A, FIG. 6B, FIG. 6C, FIG. 6D and FIG. 6E are $P_{GL}$ change diagrams (shortest path algorithm search) of an IEEE39-node system with 10% lines removed, where
Figure 6B:
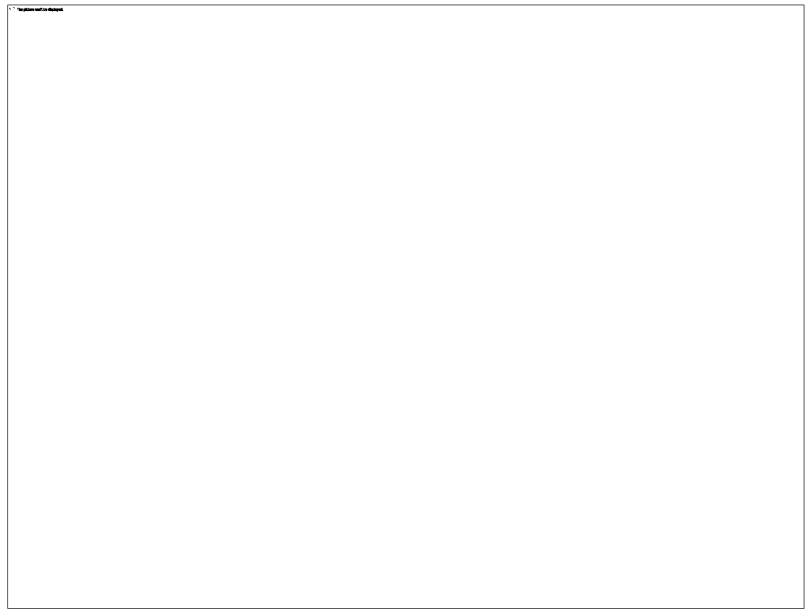
Figure 6C:
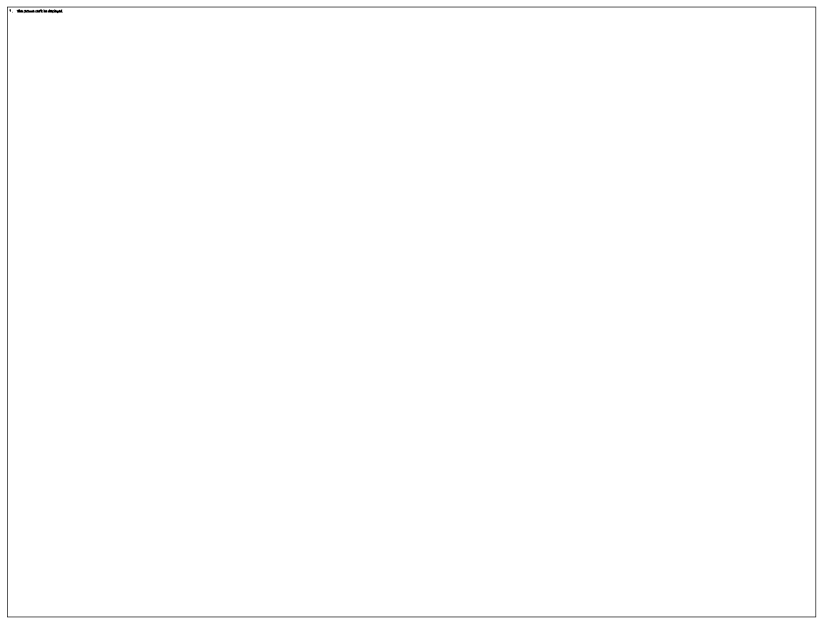
Figure 6D:
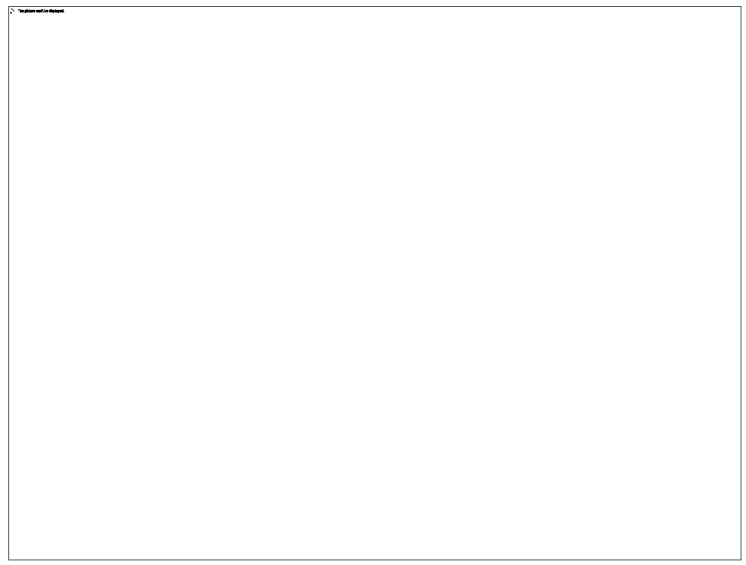
Figure 6E:
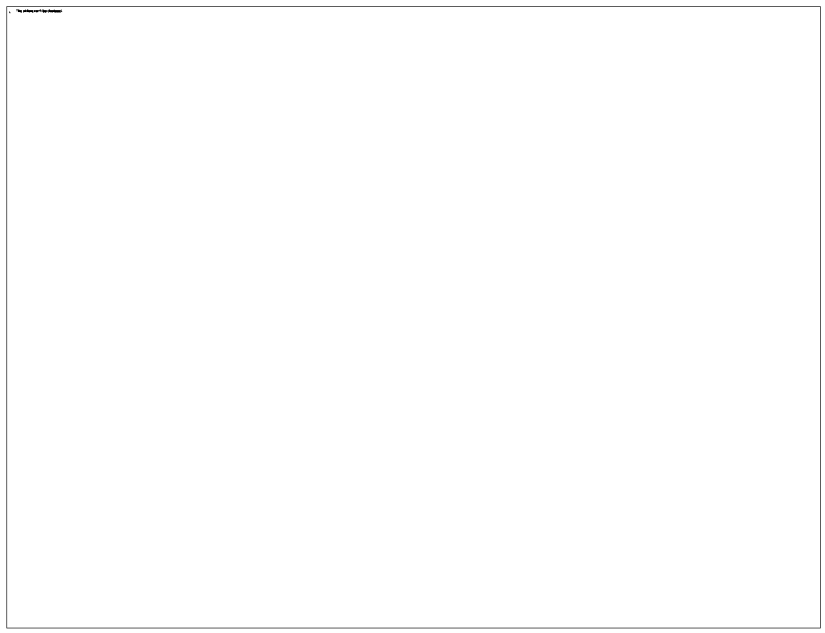
Figure 7A:
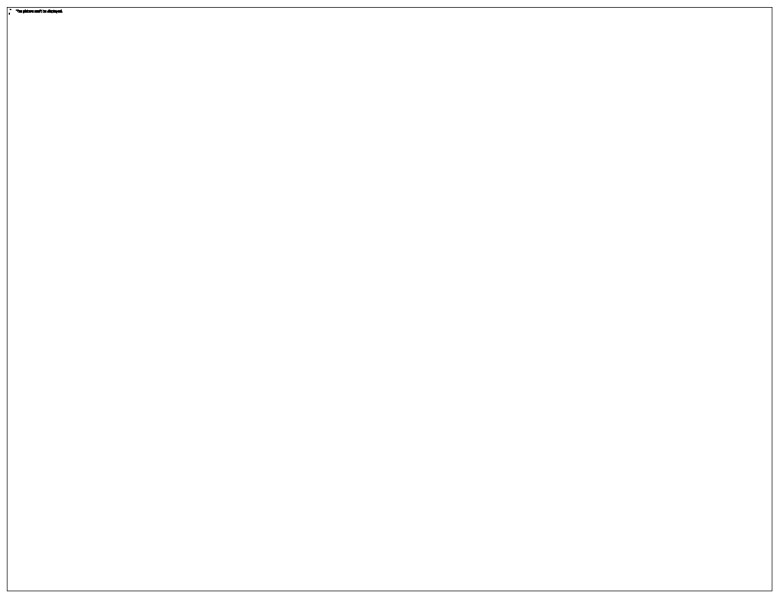
FIG. 7A, FIG. 7B, FIG. 7C, FIG. 7D and FIG. 7E are $P_{GL}$ change diagrams (shortest path algorithm search) of an IEEE118-node system after removing 10% lines according to an embodiment of the present application, where
Figure 7B:
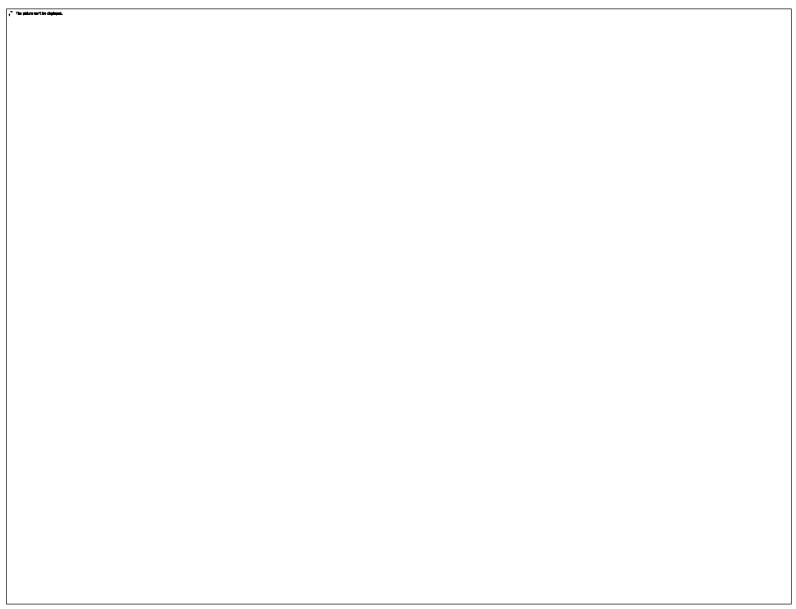
Figure 7C:
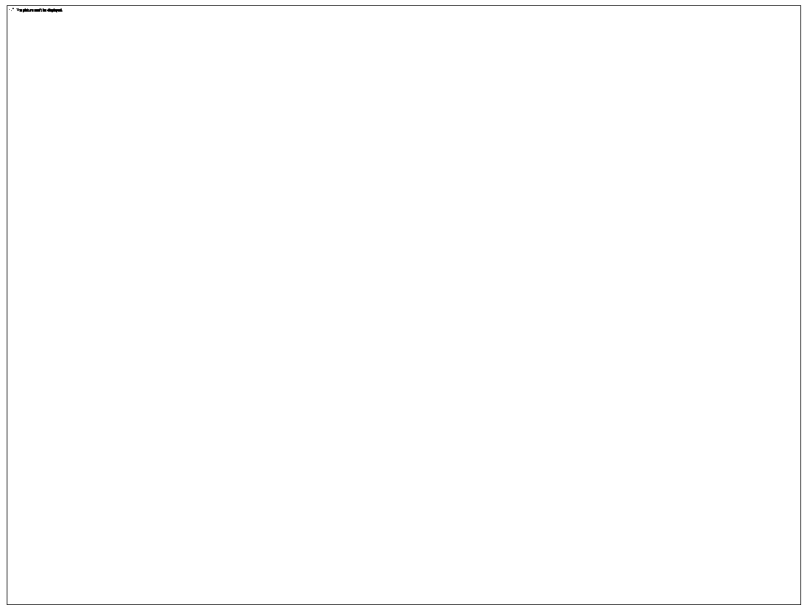
Figure 7D:
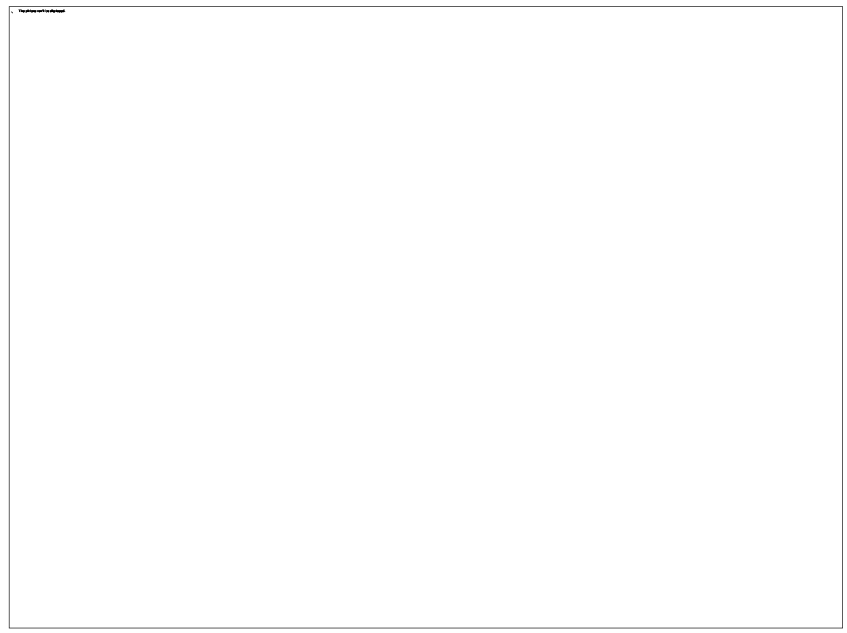
Figure 7E:
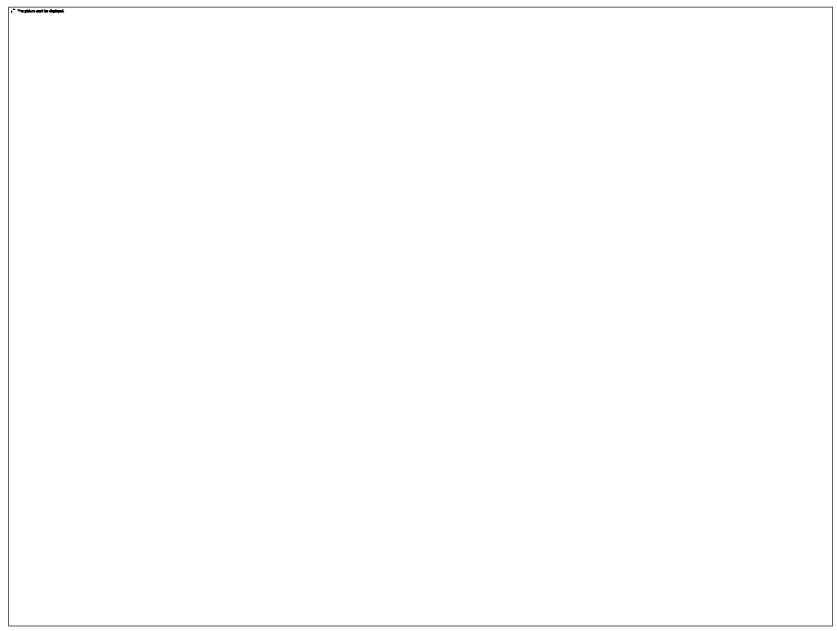

As shown in FIG. 1, this embodiment proposes a fragile line identification method of power grid based on electrical betweenness, including the following steps:

S1, constructing a network diagram of a power grid: carrying out complex network modeling on the power grid, and constructing the power grid into a network diagram containing n nodes and m edges;

S2, calculating the electrical betweenness of each line: removing one line at a time and dynamically calculating the electrical betweenness of each line according to the network diagram constructed in the S1;

The specific method is as follows:

Firstly, the complex network modeling of IEEE39 and 118 node systems is performed, and the power grid is constructed into a network diagram with n nodes and m edges. The wiring of IEEE39 system is shown in FIG. 3, and the wiring of IEEE118 system is shown in FIG. 4. Then, calculate the electrical betweenness of each line, take the maximum value and save it. Then, remove the lines with the maximum electrical betweenness, recalculate the electrical betweenness of each line, take the maximum value, save it, and repeat the above steps until all lines are removed. Finally, the saved electrical betweenness of each line are sorted from large to small and stored in the list.

S3, the cascade failure of the whole network caused by removing a single line: based on the nonlinear model of complex network cascade failure considering overload and weighted edges, purposefully selecting the line with the largest electrical betweenness to be removed from the network, and whether the adjacent edge or sub-adjacent edge of the line is overloaded or failed is judged according to the preset adjacent edge overload probability. Simulating a cascade failure caused by removing the line until the cascade failure is terminated; the greater the overload probability of an adjacent edge, the easier the adjacent edge is to overload, on the contrary, the easier the adjacent edge is to fail.

The specific method is as follows:

a nonlinear model of complex network cascade failure considering overload and weighted edges is constructed. In order to describe the relationship between load and capacity in the real network and characterize the nonlinear distribution, it is assumed that the relationship between load and capacity is as follows:

$$\begin{cases} C_{ij} = L_{ij} + \beta L_{ij}^{\alpha} \\ L_{ij} = \omega_{ij} = (k_i k_j)^{\theta} \end{cases},$$

where $\alpha \geq 0$ and $\beta \geq 0$, when $\alpha = 1$, the model is reduced to ML model; $k_i$ and $k_j$ are the degrees of the vertices of edge $e_{ij}$; $\theta$ is the parameter to adjust the load. By adjusting the load parameters, different network load distributions is simulated.

$$\Delta L_{im} + L_{im} > \delta C_{im},$$

where $\delta$ is the overload coefficient, which is used to describe the ability to handle extra load of the edge. $e_{im}$ is the adjacent side of edge $e_{ij}$, $L_{im}$ is the load of $e_{im}$, $C_{im}$ is the capacity of $e_{im}$, and the proportion of load that $e_{im}$ can share is $\Delta L_{im}$. When the load on the edge is greater than the maximum capacity, the $e_{im}$ will fail and the load on it will be redistributed again until the cascade failure stops.

Each edge has a different ability to handle the extra load. Sometimes, the edge is more sensitive to overload in a small range, and the failure probability increases rapidly, but there are also cases where the failure probability increases slowly. Adjust the distribution of failure edge $e_{im}$ by $\omega$, where $p_{im}$ is calculated as follows:

$$p_{im} = \left( \frac{L_{im} - C_{im}}{\delta C_{im} - C_{im}} \right),$$

$\alpha$ and $\beta$ are negatively correlated, and the relationship is as follows:

$$\beta = 0.1/4^{[2\theta(\alpha-1)]}.$$

Figure 2:
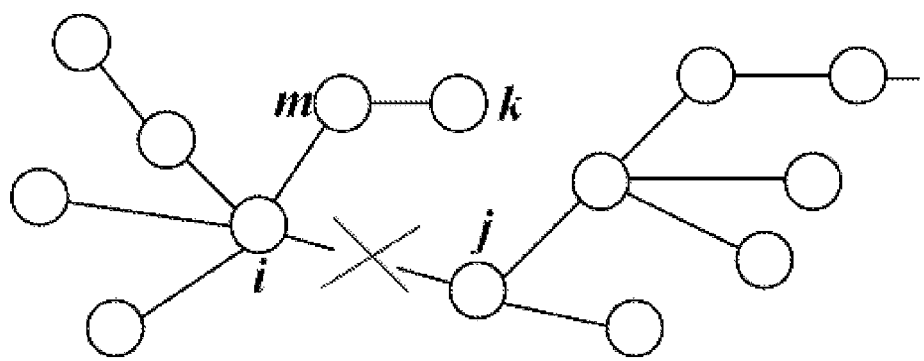
FIG. 2 is a schematic diagram of line overload according to an embodiment of the present application.

Failure of each edge will lead to overload or failure of adjacent edges and secondary edges, and the following formula is satisfied:

$$\begin{cases} C_{im} < \Delta L_{im} + L_{im} < \delta C_{im} & p_{im} < P_o \\ C_{mk} < \Delta L_{mk} + L_{mk} < \delta C_{mk} & p_{mk} < P'_o \end{cases},$$

where $P_o$ is the adjacent edge overload probability, and $P_o'$ is the sub-adjacent edge overload probability, with values ranging from 0-1. When $p_{im}$ is less than $P_o$ or $p_{mk}$ is less than $P_o'$, the line $e_{im}$ or $e_{mk}$ is overloaded; on the contrary, the line $e_{im}$, or $e_{mk}$ fails, and FIG. 2 is the schematic diagram of line overload.

After constructing the nonlinear model of complex network cascade failure considering overload and weighted edges, $P_o$ and $P_o'$ are set according to the network size, with the values of 0.7 for IEEE39-node system $P_o$, 0.8 for $P_o'$, 0.5 for IEEE118-node system $P_o$ and 0.6 for $P_o'$. Remove the line with the largest electrical betweenness in the list. Whenever a line is removed, the line will fail or overload according to the above formula until the wireless line fails, and the cascade failure caused by removing the line with the largest electrical betweenness in the list will stop this time.

S4, removing a certain proportion of lines in turn: in order to test the severity of the influence of the electrical betweenness attack on the system under different parameters, only one parameter is changed at a time, and the other parameters are unchanged, and the lines are removed in turn according to the size of the electrical betweenness, and then S3 is performed; when no new lines are removed, the operation of sequentially removing lines is stopped;

The specific method is as follows:

in order to test the severity of the electrical betweenness attack on the system under different parameters, the conventional electrical betweenness method is used to compare the effects. The conventional electrical betweenness method is as follows:

$$B_e(m, n) = \sum_{i \in G, j \in L} \sqrt{W_i W_j} \left| I^{ij}(m, n) \right|,$$

where $I^{ij}(m,n)$ is the current caused on the line (m,n) after adding a unit injection current element between the "power generation-load" node pair (i,j); $W_i$ is the weight of the generator node i, which is the rated capacity or actual output of the generator; $W$ is the weight of load node j, taking the actual or peak load; G and L are the set of all power generation and load nodes.

The IEEE39-node system removes 10% of the lines and has 4 lines. The IEEE118-node system removes 10% lines to 18 lines. Repeatedly remove that top 10% lines in the list, and repeat the S3 every time the lines are removed; when no new lines are removed, the operation of sequentially removing lines is stopped;

S5, sequentially removing all lines: in order to reflect the severity of the impact of the electrical betweenness attack on the system, removing the failure lines from large to small according to the electrical betweenness, and then go to S3; when no new lines are removed, the operation of sequentially removing lines is stopped;

The specific method is as follows:

both IEEE39 and 118 bus systems remove all lines in turn, and the failure lines are removed in turn according to the electrical betweenness, and the S3 is repeated every time the lines are removed; when no new lines are removed, the operation of sequentially removing lines is stopped;

S6, testing the identification effect of electrical betweenness: calculating the change of generator-load power $P_{GL}$ before and after each line removal, and evaluating the severity of the failure.

The specific method is as follows:

Considering that there are some limitations in measuring the process before and after power grid failure by connectivity level or load loss degree, the application puts forward the generator-load power percentage $P_{GL}$ to describe the degree of network damage:

$$P_{GL} = (\Sigma P'/P) \times 100\%,$$

where, P' is the total active power sum of all connected subgraphs after the failure, and the connected subgraphs at least contain a group of "power generation-load" node pairs; P is the sum of the total active power of the connected grid before the failure.

Cascade failure caused by each line removal will lead to the change of generator-load power $P_{GL}$ in the network, and the generator-load power changed every time will be stored in the list.

In this embodiment, in order to verify the effect of the method of the present application, the following experimental verification is also carried out.

1. Evaluate the time cost and accuracy of the electrical betweenness and the conventional method under different parameters:

Because the conventional electrical betweenness uses all path algorithms to search for "power generation-load" node pairs (i,j), when comparing the effects of the two methods in identifying fragile lines, in order to ensure the rigor of the experiment, the electrical betweenness temporarily uses all path algorithms to search for node pairs (i,j). Take the initiative to remove the top 10% lines of $B_c$ (m,n) and $NB_c$(m,n), and there are four lines. Considering that the node system is small, the direct adjacent edge overload probability $P_o$ is set to 0.7, and the indirect adjacent edge overload probability $P_o$' is set to 0.8. In order to test the severity of the influence of $B_c$ (m,n) and $NB_c$ (m,n) on the system under different parameters, only one parameter is changed at a time, and the other parameters remain unchanged. The change of $P_{GL}$ before and after the failure is shown in FIG. 5A, FIG. 5B, FIG. 5C, FIG. 5D and FIG. 5E (all path algorithm search). where FIG. 5A: $\theta=0.6$, $\omega=1$, $\delta=1.18$, FIG. 5B: $\theta=0.6$, $\omega=1$, $\delta=1.18$, FIG. 5C: $\alpha=0.45$, $\omega=1$, $\delta=1.18$, FIG. 5D: $\alpha=0.45$, $\theta=0.6$, $\delta=1.18$, FIG. 5E: $\alpha=0.45$, $\omega=1$, $\theta=0.6$. Combining FIG. 5A, FIG. 5B, FIG. 5C, FIG. 5D, and FIG. 5E, it can be seen that the new electrical betweenness removing 10% of the line is better than the conventional electrical betweenness under different parameters, except that $\alpha=0.34$ in FIG. 5A and $\theta=0.7$-$1.1$ or 1.5 in FIG. 5C. In order to overcome the limitation of previous methods that assume that electric power flow flows along the shortest path, all path algorithms are used to search for "generator-load" node pairs (i,j), and the actual power grid characteristics are considered. However, it takes too much time to search with all the path algorithms. There are as many as 7,599 paths to search for "power generation-load" in IEEE39-node system, and the search time will be longer in more node systems. Therefore, the following simulation experiments all use the shortest path algorithm to search for "power generation-load" node pairs (i,j).

Next the shortest path algorithm is used to compare the accuracy of the two methods for identifying fragile lines, and the top 10% lines sorted by $B_e$(m,n) and $NB_e$(m,n) are actively removed, with the overload probability of the direct adjacent edge Po set to 0.7 and the overload probability of the indirect adjacent edge $P_o$' set to 0.8. In order to test the severity of the influence of $B_e$ (m,n) and $NB_e$ (m,n) on the system under different parameters, only one parameter is changed at a time, and the other parameters remain unchanged. The change of $P_{GL}$ before and after the failure is shown in FIG. 6A, FIG. 6B, FIG. 6C, FIG. 6D and FIG. 6E (shortest path algorithm search), where, FIG. 6A $\theta=0.6$, $\omega=1$, $\delta=1.18$, FIG. 6B $\theta=0.6$, $\omega=1$, $\delta=1.18$, FIG. 6C $\alpha=0.45$, $\omega=1$, $\delta=1.18$, FIG. 6D $\alpha=0.45$, $\theta=0.6$, $\delta=1.18$, FIG. 6E $\alpha=0.45$, $\omega=1$, $\theta=0.6$. As shown in FIG. 6A, FIG. 6B, FIG. 6C, FIG. 6D, and FIG. 6E, under the given parameters, at $\theta=1.5$-$1.9$, $\omega=0.75$ and $\delta=1.15$, the effect of the conventional electrical betweenness removing 10% of the line is better than the electrical betweenness; on the whole, the electrical betweenness actively removing 10% of the line is significantly better than the conventional electrical betweenness.

In order to test the severity of the influence of $B_e$(m,n) and $NB_e$(m,n) on IEEE118-node system under different parameters, the top 10% lines, about 18 edges, are removed according to the conventional electrical betweenness and the electrical betweenness. The IEEE118-node system has more node lines than the 39-node system, so it is not necessary to consider that the failure of one edge will cause large-scale network failure, so the direct adjacent edge overload probability $P_o$ is set to 0.5, and the indirect adjacent edge overload probability $P_o$' is set to 0.6. Only one parameter is changed at a time, and the other parameters remain unchanged. The change of $P_{GL}$ before and after the failure is shown in FIG. 7A, FIG. 7B, FIG. 7C, FIG. 7D, and FIG. 7E, where FIG. 7A: $\theta=0.6$, $\omega=1$, $\delta=1.05$, FIG. 7B: $\theta=0.6$, $\omega=1$, $\delta=1.15$, FIG. 7C: $\alpha=0.45$, $\omega=1$, $\delta=1.15$, FIG. 7D: $\alpha=0.45$, $\theta=0.6$, $\delta=1.15$, and FIG. 7E: $\alpha=0.45$, $\omega=1$, $\theta=0.6$, as can be seen from FIG. 7A, FIG. 7C and FIG. 7E, under given parameters, at $\theta=1.1$-$1.9$, the effect of power loss caused by the conventional electrical betweenness is better than that caused by the electrical betweenness, and as can be seen from FIG. 7A, FIG. 7B and FIG. 7D, the effect of power loss caused by the electrical betweenness is better than that caused by the conventional electrical betweenness. On the whole, the electrical betweenness identification method is superior to the conventional electrical betweenness identification method in removing 10% lines on the IEEE118-node system and causing power loss.

It is found by simulation that by changing the parameters in the cascade failure model, the robustness of the model will be affected to some extent. For example, decreasing $\alpha$ or increasing $\beta$, $\theta$, $\omega$ and $\delta$ can improve the robustness of the power grid to some extent. On the contrary, increasing $\alpha$ or decreasing $\beta$, $\theta$, $\omega$ and $\delta$ can reduce the robustness of the power grid to some extent.

Figure 8:
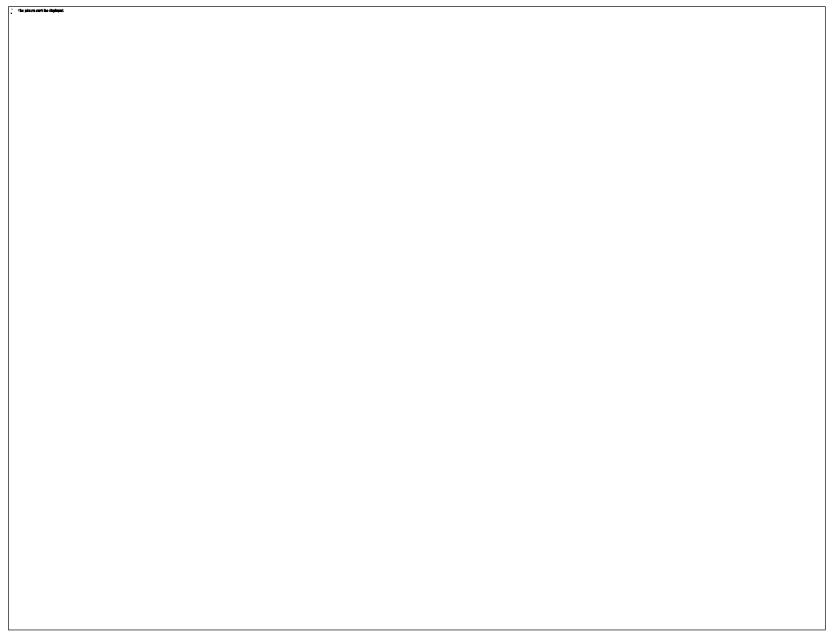
FIG. 8 is a $P_{GL}$ change diagram (all path algorithm search) of an IEEE39-node system after all lines are removed in sequence according to an embodiment of the present application.
Figure 9:
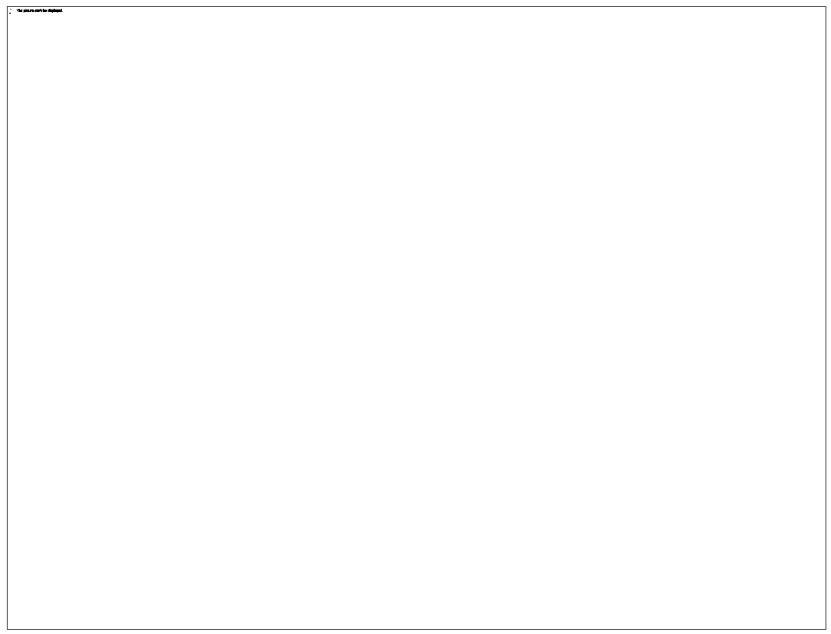
FIG. 9 is a $P_{GL}$ change diagram (shortest path algorithm search) of an IEEE39-node system after all lines are removed in sequence according to an embodiment of the present application.

Second, evaluate the severity of the impact of the electrical betweenness attack on the system:

in order to reflect the severity of the impact of the electrical betweenness attack on the system, the failure lines are removed in order of conventional electrical betweenness and electrical betweenness, and the corresponding PGL changes are shown in FIG. 8 (all path algorithm search). When $\alpha=0.45$, $\omega=1$, $\theta=0.6$, and $\delta=1.18$, it can be seen from FIG. 8 that at 19-21 consecutive attacks, the effect of power loss caused by the electrical betweenness attack is better than that caused by the conventional electrical betweenness attack, and the effect of other sections is even. By comparing FIG. 5, FIG. 6, FIG. 8 and FIG. 9, it is obvious that the two methods are more effective in searching fragile lines based on all path algorithms, while there are only 218 shortest paths for searching "power generation-load" in IEEE39-node system, which reduces the accuracy, but gives consideration to both accuracy and efficiency to a certain extent.

Figure 10:
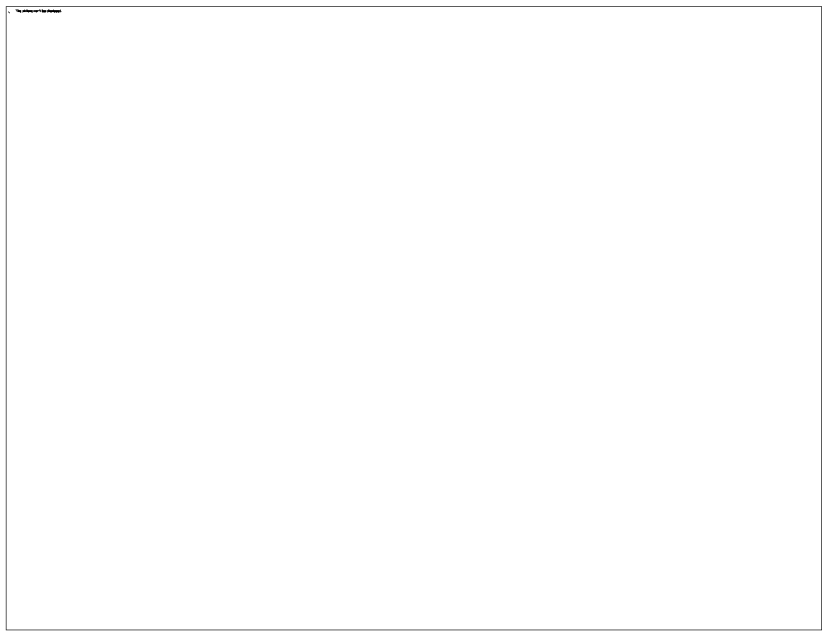
FIG. 10 is a $P_{GL}$ change diagram (shortest path algorithm search) of an IEEE118-node system after all lines are removed in sequence according to an embodiment of the present application.

In order to compare the severity of the impact of the two methods on the system, the failure lines are removed in order of electrical betweenness and electrical betweenness, and the corresponding $P_{GL}$ changes are shown in FIG. 10. When $\alpha=0.45$, $\omega=1$, $\theta=0.6$, $\delta=1.15$, it can be seen from FIG. 10 that in the section of identifying fragile lines sorted 1-13, the effect of the electrical betweenness in identifying fragile lines is slightly worse than that of the conventional electrical betweenness, and the other parts are obviously better than that of the conventional electrical betweenness. By comparing FIG. 9 (shortest path algorithm search) with FIG. 10, it is found that the effect of conventional electric betweenness in identifying fragile lines is better than that of the electric betweenness as a whole.

The above is only the preferred embodiment of this application, but the protection scope of this application is not limited to this. Any change or replacement that can be easily thought of by a person familiar with this technical field within the technical scope disclosed in this application should be included in the protection scope of this application. Therefore, the protection scope of this application should be based on the protection scope of the claims.

What is claimed is:

1. A method for identifying fragile lines in power grids based on electrical betweenness, comprising:

constructing the power grids into a network diagram, sequentially removing lines in the network diagram, and sorting the electrical betweenness of each of the lines from large to small;

constructing a nonlinear model of complex network cascade failure considering overload and weighted edges, and respectively performing two ways of removing the lines for sorted electrical betweenness according to the nonlinear model of the complex network cascade failure, sequentially removing preset proportion lines and sequentially removing all lines respectively until no new lines are removed in the network diagram, wherein the nonlinear model of the complex network cascade failure considering the overload and the weighted edges comprises five parameters: $\alpha$, $\beta$, $\theta$, $\omega$ and $\delta$ respectively, changing only one parameter at a time, and keeping rest parameters unchanged, wherein removing the preset proportion lines is to test an influence of different parameters on identification of electrical betweenness lines under the nonlinear model of the complex network cascade failure, and removing all the lines to test an identification effect of the electrical betweenness lines with fixed parameters; and obtaining a change of generator-load power before and after removing the lines each time, and evaluating a severity of power grid failure based on the change of the generator-load power, and completing identification of the fragile lines in power grids.

2. The method for identifying fragile lines in power grids based on electrical betweenness according to claim 1, wherein sorting the electrical betweenness of each of the lines comprises:

obtaining the electrical betweenness of all lines in the network diagram, and saving the electrical betweenness with a maximum value; and removing the lines of the electrical betweenness with the maximum value, re-obtaining electrical betweenness of remaining lines, saving a maximum value of the re-obtained electrical betweenness, repeating the operation until all lines are removed, and finally sorting saved electrical betweenness of each line from large to small.

3. The method for identifying fragile lines in power grids based on electrical betweenness according to claim 1, wherein sequentially removing the preset proportion lines according to the sorted electrical betweenness comprises:

changing only one parameter in the nonlinear model of the complex network cascade failure at a time, keeping the rest parameters unchanged, sorting according to the sorted electrical betweenness, and sequentially removing the preset proportion lines, wherein a preset processing is repeated after one line is removed at a time until all the preset proportion lines are removed from the network diagram.

4. The method for identifying fragile lines in power grids based on electrical betweenness according to claim 3, wherein sequentially removing all the lines according to the sorted electrical betweenness comprises:

keeping the parameters in the nonlinear model of the complex network cascade failure unchanged, sorting according to the sorted electrical betweenness, sequentially removing the lines in the network diagram from large to small, removing one line at a time and repeating the preset processing c time until the network diagram is without lines.

5. The method for identifying fragile lines in power grids based on electrical betweenness according to claim 4, wherein the preset processing comprises:

sequentially removing the sorted lines with a largest electrical betweenness from the network diagram, and simulating the cascade failure caused by removing the lines until the cascade failure is terminated.

6. The method for identifying fragile lines of in power grids based on electrical betweenness according to claim 5, wherein sequentially removing the lines with the largest electrical betweenness from the network diagram comprises:

removing the lines with the largest electrical betweenness from the network diagram on the nonlinear model of the complex network cascade failure, and judging whether an adjacent edge or a sub-adjacent edge of the line overloaded or failed according to a preset adjacent edge overload probability.

7. The method for identifying fragile lines of in power grids based on electrical betweenness according to claim 6, wherein until the cascade failure being terminated comprises:

sequentially removing the lines with the largest electrical betweenness in a list, performing line failure or the overload according to a preset formula every time the lines are removed until no lines in the network diagram fail, and then correspondingly the cascade failure caused by removing the lines with the largest electrical betweenness in the list being terminated.

8. The method for identifying fragile lines in power grids based on electrical betweenness according to claim 7, wherein the preset formula is:

$$\begin{cases} C_{im} < \Delta L_{im} + L_{im} < \delta C_{im} & p_{im} < P_o \\ C_{mk} < \Delta L_{mk} + L_{mk} < \delta C_{mk} & p_{mk} < P_o' \end{cases},$$

wherein $P_o$ is an adjacent edge overload probability, $P_o'$ is a sub-adjacent edge overload probability, $p_{im}$ is a distribution of a failure edge $e_{im}$, $p_{mk}$ is a distribution of failure edge $e_{mk}$, $L_{im}$ is a load of $e_{im}$, $C_{im}$ is a capacity of $e_{im}$, $e_{im}$ is an adjacent edge of edge $e_{ij}$, $L_{mk}$ is a load of $e_{mk}$, $C_{mk}$ is a capacity of $e_{mk}$, $e_{mk}$ is an adjacent edge of edge $e_{im}$, $\delta$ is an overload coefficient, a proportion of the load shared by $e_{im}$ is $\Delta L_{im}$, when $p_{im}$ is less than $P_o$ or $p_{mk}$ is less than $P_o'$, the line $e_{im}$ or $e_{mk}$ is overloaded; otherwise, the line $e_{im}$ or $e_{mk}$ fails.

9. The method for identifying fragile lines in power grids based on electrical betweenness according to claim 1, wherein an acquisition method of the change of the generator-load power before and after removing the lines is:

$$P_{GL} = (\Sigma P'/P) \times 100\%,$$

wherein P' is a total active power sum of all connected sub-diagrams after the failure, P is a total active power sum of connected networks before the failure, and $P_{GL}$ is a percentage of the generator-load power.

* * * * *